(No Model.) 2 Sheets—Sheet 1.

W. RAYMOND.
CHUCK FOR MACHINE TOOLS.

No. 544,006. Patented Aug. 6, 1895.

WITNESSES:
George B. Motte
Milton J. Constable

INVENTOR
Warren Raymond

UNITED STATES PATENT OFFICE.

WARD RAYMOND, OF JOHNSTOWN, PENNSYLVANIA.

CHUCK FOR MACHINE-TOOLS.

SPECIFICATION forming part of Letters Patent No. 544,006, dated August 6, 1895.

Application filed February 25, 1895. Serial No. 539,557. (No model.)

*To all whom it may concern:*

Be it known that I, WARD RAYMOND, of Johnstown, county of Cambria, State of Pennsylvania, have invented a new and useful Improvement in Chucks for Machine-Tools, of which the following is a full and exact description, due reference being had to the accompanying drawings.

My invention relates to an improved chuck or clamp for machine-tools, and is specially adapted to such metal-working tools as milling-machines, planers, shapers, and many other types which are provided with a flat table or platen, upon which the work to be operated upon is firmly secured.

The object of my invention is to provide a chuck which is readily adapted to clamp the work in various positions, and is at the same time stiff and firm.

I will now describe my invention with the aid of the drawings, in which—

Figure 1:
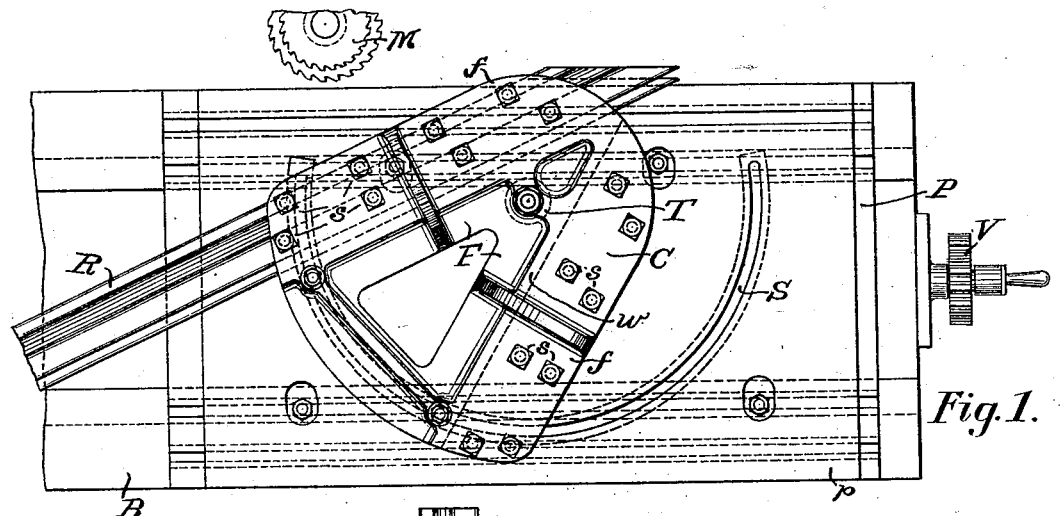
Figure 2:
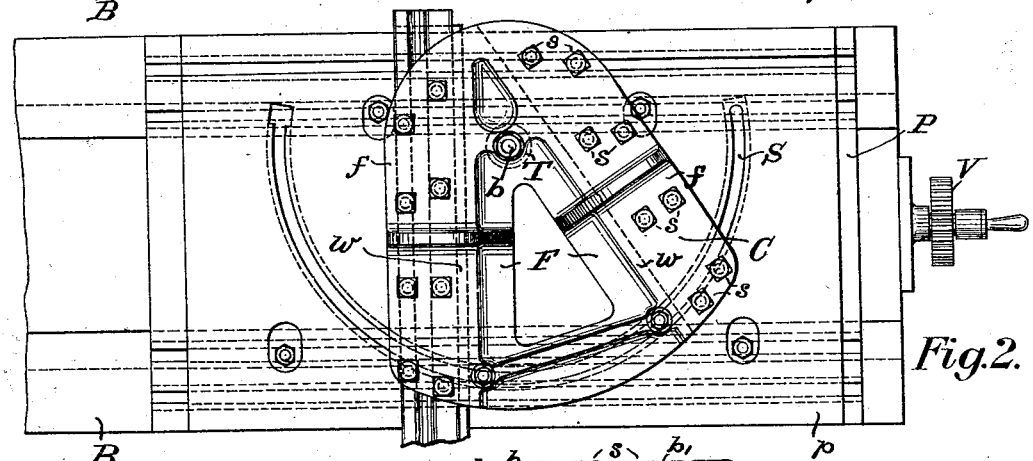
Figure 3:
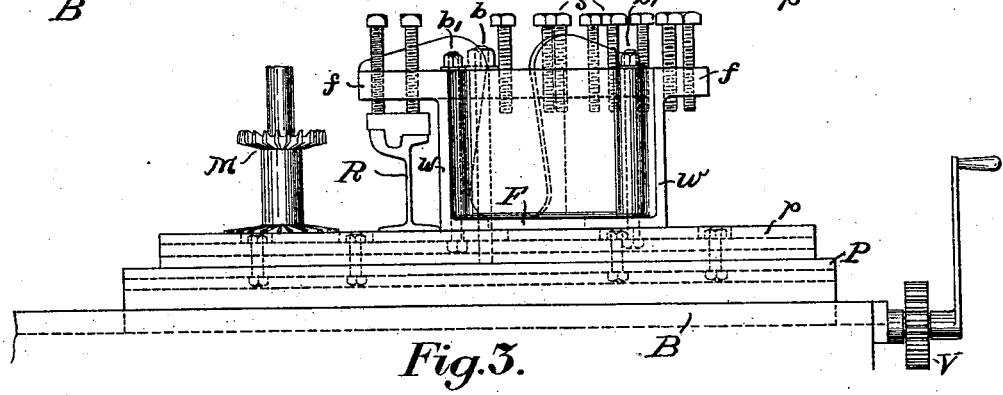
Figure 4:
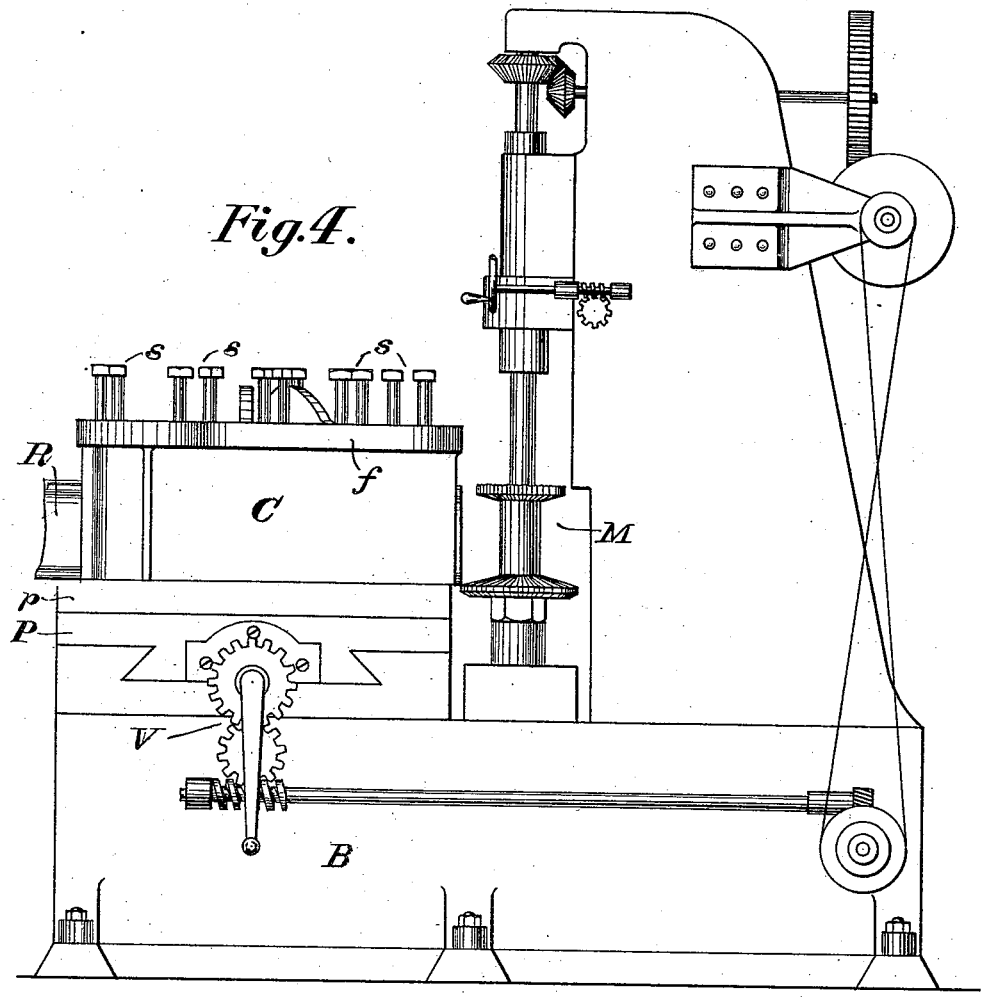

Figure 1 represents a top view of the platen of a milling-machine, upon which platen is secured a chuck embodying my invention. Fig. 2 is also a top view of the same machine, but with the chuck holding the work at a different angle. Fig. 3 is a side view of Fig. 2. Fig. 4 is a general side view of a milling-machine having the chuck arrangement thereon.

B is the base or bed plate of the machine, upon which travels the platen P, operated by feed mechanism V.

Upon the platen P is secured the supplemental platen $p$, which carries the chuck C. This chuck is composed of the bottom plate or flanges F lying upon the platen $p$, the vertical webs $w$, and the overhanging flanges $f$. The webs $w$ are placed at an angle to each other, so that the chuck is substantially V-shaped. Near the apex or narrow end of it is the pivot or trunnion T, upon which it swings. Through this trunnion passes the holding-down bolt $b$, and near the back end of the chuck are the bolts $b'$, the heads of which slide in the T-slot S. It will be seen that by loosening these three bolts the chuck may be readily swung to any angle on the platen $p$ and firmly clamped there by tightening the bolts. In the top flanges $f$ are the set-screws $s$, by which any work, as the rail R, is rigidly clamped.

In Fig. 1 the chuck is shown as set to hold the rail R so that the milling-cutter M will cut it at an angle, while in Fig. 2 it is shown for a square cut. Were the rail to be cut on the opposite angle from that shown in Fig. 1 the other side of the chuck would be used and it would be swung around accordingly.

By forming my chuck having the overhang flanges on each side and having the apex at the front end and broad base at the back I am enabled to make either right or left hand angle cuts, and while the narrow front end permits the end of the work to be operated upon to always occupy the same place the broad base affords a backing and prevents any tilting or springing of the clamp.

Having thus described my invention, what I claim, and desire to protect by Letters Patent, is—

1. A chuck for metal working tools, said chuck having a body with a narrow end or apex toward the operating end and a wider rear end, two flanges, one overhanging each side of the body, and clamping members in said flanges, said chuck being adapted to be adjustably secured to the platen of the machine.

2. A chuck for metal working tools, said chuck comprising a V shaped body portion adapted to be pivoted near its apex to the platen of the machine, flanges, one overhanging each side of the body portion, clamping members on said flanges, and holding down members near the rear end of the body portion adapted to rigidly secure it to the platen of the machine.

3. In a metal working tool in combination with the platen of the machine a chuck having a V shaped body pivoted near its apex to said platen and flanges, overhanging each side of said body portion, clamping members in said flanges, a slot in said platen and bolts passing through said slot and the chuck near the rear end whereby the chuck is rigidly secured upon the platen.

4. In combination with the platen of a metal working tool, a chuck comprising two vertical sides angularly disposed toward each other, outwardly projecting flanges at the top of said vertical sides, and clamping members carried by said flanges; the whole being pivotally mounted near its narrow end upon the said platen, and adapted to be clamped thereupon.

In testimony whereof I have affixed my signature in presence of two witnesses.

WARD RAYMOND.

Witnesses:
S. G. BONN,
MERLE J. WIGHTMAN.